United States Patent
Rodriguez Bravo et al.

(10) Patent No.: US 12,155,233 B2
(45) Date of Patent: Nov. 26, 2024

(54) SYSTEM FOR WIRELESSLY CHARGING AN ELECTRONIC DEVICE

(71) Applicant: KYNDRYL, INC., New York, NY (US)

(72) Inventors: Cesar Augusto Rodriguez Bravo, Alajuela (CR); David Alonso Campos Batista, Aurora (CR); Sarbajit K. Rakshit, Kolkata (IN)

(73) Assignee: Kyndryl, Inc., New York, NY (US)

( * ) Notice: Subject to any disclaimer, the term of this patent is extended or adjusted under 35 U.S.C. 154(b) by 527 days.

(21) Appl. No.: 17/499,962

(22) Filed: Oct. 13, 2021

(65) Prior Publication Data

US 2023/0112408 A1 Apr. 13, 2023

(51) Int. Cl.
| | |
|---|---|
| *H01M 10/46* | (2006.01) |
| *H02J 50/50* | (2016.01) |
| *H02J 50/80* | (2016.01) |
| *H02J 50/90* | (2016.01) |
| *H02J 50/10* | (2016.01) |

(52) U.S. Cl.
CPC .............. *H02J 50/50* (2016.02); *H02J 50/80* (2016.02); *H02J 50/90* (2016.02); *H02J 50/10* (2016.02)

(58) Field of Classification Search
CPC ...... H02J 7/0042; H02J 7/00034; H02J 50/10; H02J 50/90; H02J 50/50; H02J 50/80; H02J 50/005
USPC .......................... 320/104, 108, 109, 114, 115
See application file for complete search history.

(56) References Cited

U.S. PATENT DOCUMENTS

| | | | |
|---|---|---|---|
| 7,791,311 | B2 | 9/2010 | Sagoo |
| 9,190,849 | B2 | 11/2015 | Won et al. |
| 9,269,333 | B2 | 2/2016 | Yu |
| 9,979,241 | B2 | 5/2018 | Park |
| 10,496,953 | B1 | 12/2019 | Hahn et al. |
| 10,600,070 | B2 | 3/2020 | Im et al. |

(Continued)

FOREIGN PATENT DOCUMENTS

| | | |
|---|---|---|
| CN | 201656503 U | 11/2010 |
| DE | 102022203335 A1 * | 10/2023 |

(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Edward Tso
(74) *Attorney, Agent, or Firm* — Dan Housley; Andrew M. Calderon; Calderon Safran & Wright P.C.

(57) ABSTRACT

Control system for facilitating wireless charging of an electronic device is provided, which identifies presence of multiple electronic devices within an environment, with the multiple electronic devices including a self-propelled power relay device with wireless charging capability. Control system processing determines that an electronic device of the multiple electronic devices requires wireless charging, and based on the determining, deploys the self-propelled power relay device to move to an area of the environment within a charging range of the electronic device to facilitate wireless charging of the electronic device via the self-propelled power relay device.

20 Claims, 15 Drawing Sheets

(56) References Cited

U.S. PATENT DOCUMENTS

| | | | |
|---|---|---|---|
| 2017/0083073 A1 | 3/2017 | Chakra et al. | |
| 2017/0355271 A1 | 12/2017 | Cronie | |
| 2018/0262031 A1 | 9/2018 | Cogill et al. | |
| 2018/0351394 A1 | 12/2018 | Gu et al. | |
| 2019/0115792 A1 | 4/2019 | Zeine et al. | |
| 2019/0288540 A1 | 9/2019 | Dang et al. | |
| 2020/0044474 A1 | 2/2020 | Baysinger et al. | |
| 2020/0203982 A1 | 6/2020 | Liu et al. | |
| 2020/0262305 A1* | 8/2020 | Chakraborty | B60L 53/57 |

FOREIGN PATENT DOCUMENTS

| | | | |
|---|---|---|---|
| EP | 2 773 009 A1 | 9/2014 | |
| JP | 2016506228 A | 2/2016 | |
| WO | WO 2015/115723 A1 | 8/2015 | |
| WO | WO-2020176860 A1 * | 9/2020 | B60L 53/12 |
| WO | WO-2021151542 A1 * | 8/2021 | B60L 53/12 |

OTHER PUBLICATIONS

IBM Publication, "z/Architecture Principles of Operation," IBM® Publication No. SA22-7832-12, 13th Edition, Sep. 2019 (pp. 1-2000).

Alsumady et al., "Mobile to Mobile Wireless Power Transfer", Yarmouk University, Jul. 2019, vol. 14.2-3, pp. 95-117 (Year: 2019).

IP.com, "Method and System for Wireless Recharging of Robotic Toys by Mutually Coupling Rechargeable Components", IPCOM000252773D, published Feb. 8, 2018 (3 pages).

IP.com, "Method and System for Intelligent Device to Device Wireless Power Transfer to Ensure Continuity of Content Display in Same Device", IPCOM000252903D, published Feb. 20, 2018 (4 pages).

IP.com, "Method and System for a Flexible Snake Robot Assembly for Optimized Wireless Charging of Multiple Devices", IPCOM000262144D, published May 5, 2020 (4 pages).

IP.com, "Method and System for Multi-Device Paring Route Creation for Wireless Power Transfer", IPCOM000263081D, published Jul. 28, 2020 (5 pages).

* cited by examiner

IDENTIFY PRESENCE OF MULTIPLE ELECTRONIC DEVICES WITHIN AN ENVIRONMENT, THE MULTIPLE ELECTRONIC DEVICES INCLUDING A SELF-PROPELLED POWER RELAY DEVICE WITH WIRELESS CHARGING CAPABILITY ~800

DETERMINE THAT AN ELECTRONIC DEVICE OF THE MULTIPLE ELECTRONIC DEVICES REQUIRES CHARGING ~802

BASED ON THE DETERMINING, DEPLOY THE SELF-PROPELLED POWER RELAY DEVICE TO MOVE TO AN AREA OF THE ENVIRONMENT WITHIN A CHARGING RANGE OF THE ELECTRONIC DEVICE TO FACILITATE WIRELESS CHARGING OF THE ELECTRONIC DEVICE VIA THE SELF-PROPELLED POWER RELAY DEVICE ~804

WHERE THE DEPLOYING IS FURTHER BASED ON DETERMINING THAT THE ELECTRONIC DEVICE IS OUTSIDE THE CHARGING RANGE FROM A WIRELESS CHARGING STATION, AND WHERE THE MOBILE ELECTRONIC DEVICE IS A NON-SELF-PROPELLED ELECTRONIC DEVICE ~806

WHERE THE SELF-PROPELLED POWER RELAY DEVICE IS A ROBOTIC DEVICE CONFIGURED TO PERFORM AN ACTIVITY, AND THE METHOD FURTHER INCLUDES DEPLOYING THE SELF-PROPELLED POWER RELAY DEVICE TO PERFORM THE ACTIVITY WITHIN THE AREA OF THE ENVIRONMENT IN PARALLEL WITH FACILITATING WIRELESS CHARGING OF THE ELECTRONIC DEVICE ~808

WHERE THE MULTIPLE ELECTRONIC DEVICES WITHIN THE ENVIRONMENT INCLUDE AT LEAST TWO SELF-PROPELLED POWER RELAY DEVICES WITH WIRELESS CHARGING CAPABILITY, AND WHERE THE METHOD FURTHER INCLUDES IDENTIFYING THE SELF-PROPELLED POWER RELAY DEVICE FROM THE AT LEAST TWO SELF-PROPELLED POWER RELAY DEVICES TO DEPLOY TO THE AREA OF THE ENVIRONMENT TO PERFORM THE ACTIVITY WITHIN THE AREA IN PARALLEL WITH FACILITATING WIRELESS CHARGING OF THE ELECTRONIC DEVICE ~810

FIG. 8A

FURTHER INCLUDING DETERMINING CURRENT LOCATIONS OF THE MULTIPLE ELECTRONIC DEVICES WITHIN THE ENVIRONMENT, AND WHERE THE DEPLOYING IS FURTHER BASED ON DETERMINING THAT THE ELECTRONIC DEVICE IS OUTSIDE THE CHARGING RANGE FROM A WIRELESS CHARGING STATION ~812

WHERE THE DEPLOYING FURTHER INCLUDES DEPLOYING THE SELF-PROPELLED POWER RELAY DEVICE TO A CONFIGURABLE, PREDETERMINED LOCATION WITHIN THE AREA OF THE ENVIRONMENT IN THE CHARGING RANGE OF THE ELECTRONIC DEVICE ~814

WHERE THE SELF-PROPELLED POWER RELAY DEVICE IS A ROBOTIC DEVICE CONFIGURED TO PERFORM AN ACTIVITY, AND THE DEPLOYING OF THE SELF-PROPELLED POWER RELAY DEVICE TO THE CONFIGURABLE, PREDETERMINED LOCATION IS FURTHER BASED ON DETERMINING THAT THE SELF-PROPELLED POWER RELAY DEVICE IS NOT CURRENTLY REQUIRED TO PERFORM THE ACTIVITY WITHIN THE AREA ~816

FURTHER INCLUDING RECEIVING, A SET OF ATTRIBUTES FOR EACH ELECTRONIC DEVICE WITHIN A PREDETERMINED AREA OF THE ENVIRONMENT OF THE MULTIPLE ELECTRONIC DEVICES IDENTIFIED, THE SET OF ATTRIBUTES BEING SELECTED FROM THE GROUP CONSISTING OF: A CAPABILITY OF RECEIVING A WIRELESS CHARGE, A CAPABILITY OF DELIVERING A WIRELESS CHARGE, WHETHER THE ELECTRONIC DEVICE IS A SELF-PROPELLED POWER RELAY DEVICE, WHETHER THE ELECTRONIC DEVICE IS A ROBOTIC DEVICE SCHEDULED TO PERFORM AN ACTIVITY, A MINIMUM POWER THRESHOLD OF THE ELECTRONIC DEVICE, A CURRENT POWER CHARGE, ONE OR MORE PREPROGRAMMED ACTIVITIES OF THE ELECTRONIC DEVICE, AND TIME REQUIRED TO COMPLETE EACH PREPROGRAMMED ACTIVITY ~818

WHERE THE ENVIRONMENT IS A BUILDING, AND THE IDENTIFYING, THE DETERMINING, AND THE DEPLOYING ARE PERFORMED BY AN INTELLIGENT CONTROL SYSTEM OF THE BUILDING ~820

FIG. 8B

SYSTEM FOR WIRELESSLY CHARGING AN ELECTRONIC DEVICE

BACKGROUND

Today, many computing systems include mobile electronic devices with wireless communication capability, such as smartphones, as part of an Internet of Things (IoT) configuration, in which interconnected devices can be scattered about, or across, an environment, such as a residence, with the devices being interconnected via one or more networks, such as via the Internet. Further, IoT devices can be embedded into a variety of products. These computing systems have resulted in the continued proliferation of electronic devices, such as, for instance, smartphones or other IoT devices, that utilize power provided by one or more rechargeable batteries. For instance, many residences contain various portable, or mobile, electronic devices, such as cell phones, music players, video players, laptops, among other devices.

SUMMARY

Certain shortcomings of the prior art are overcome and additional advantages are provided through the provision, in one or more aspects, of a computer program product for facilitating charging of an electronic device. The computer program product includes at least one computer-readable storage medium having program instructions embodied therewith. The program instructions are readable by a processing circuit to cause the processing circuit to perform a method including identifying presence of multiple electronic devices within an environment. The multiple electronic devices include a self-propelled power relay device with wireless charging capability. The method further includes determining that an electronic device of the multiple electronic devices requires charging, and based on the determining, deploying the self-propelled power relay device to move to an area of the environment within a charging range of the electronic device to facilitate wireless charging of the electronic device via the self-propelled power relay device.

Computer systems and computer-implemented processes relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 8A-8B depict a further embodiment of a workflow illustrating certain aspects of one or more embodiments of the present invention;

DETAILED DESCRIPTION

Aspects of the present invention and certain features, advantages, and details thereof, are explained more fully below with reference to the non-limiting example(s) illustrated in the accompanying drawings. Descriptions of well-known materials, fabrication tools, processing techniques, etc., are omitted so as not to unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, which are not drawn to scale for ease of understanding, wherein the same reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application of the concepts disclosed herein.

Note also that illustrative embodiments are described below using specific code, designs, architectures, protocols, layouts, schematics, or tools, only as examples, and not by way of limitation. Furthermore, the illustrative embodiments are described in certain instances using particular software, tools, or data processing environments only as example for clarity of description. The illustrative embodiments can be used in conjunction with other comparable or similarly-purposed structures, systems, applications, or architectures. One or more aspects of an illustrative embodiment can be implemented in software, hardware, or a combination thereof.

Figure 9:
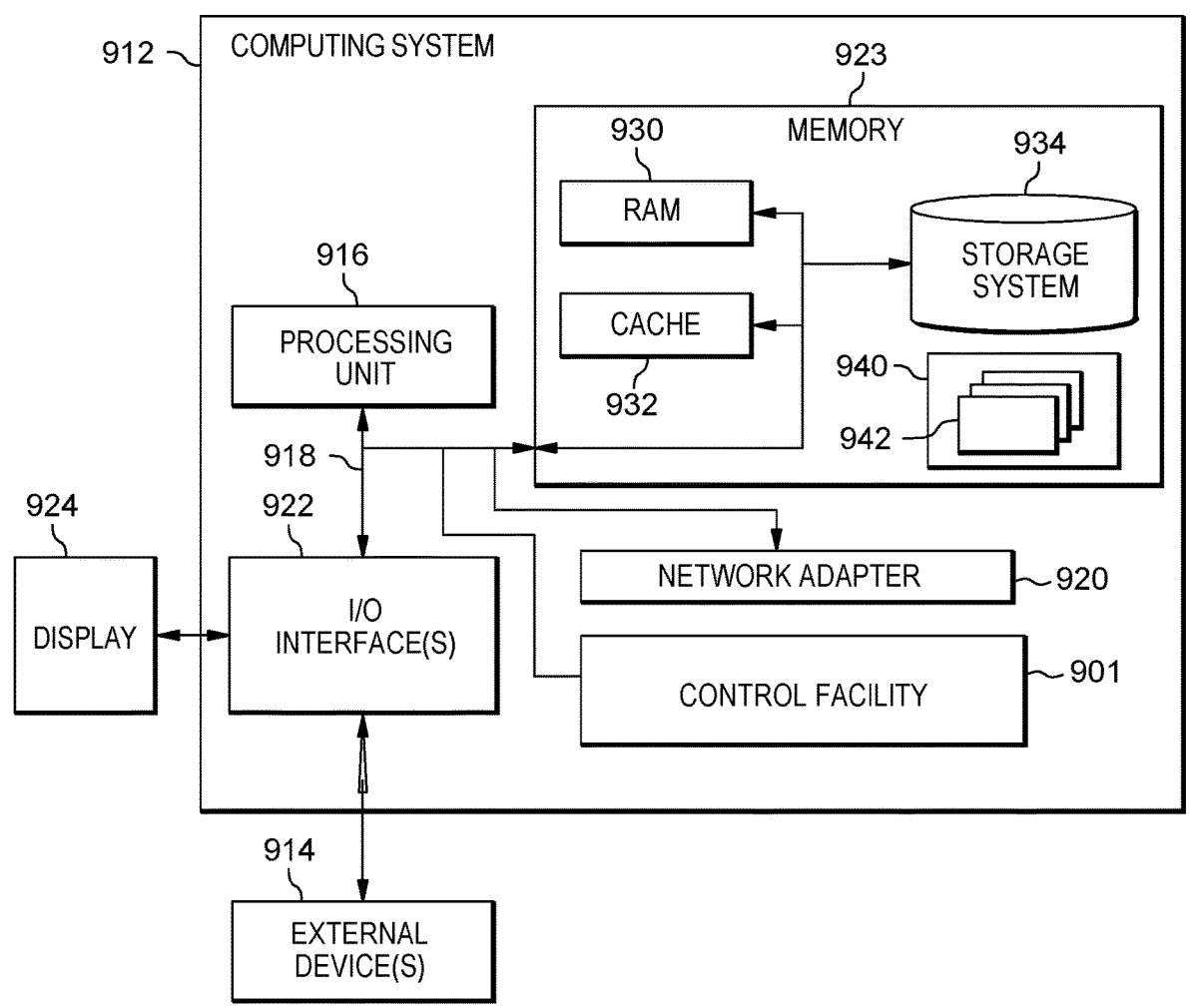
FIG. 9 depicts another embodiment of a computing environment to incorporate and use one or more aspects of the present invention.

As understood by one skilled in the art, program code, as referenced to in this application, can include software and/or hardware. For example, program code in certain embodiments of the present invention can include a software-based implementation of the functionality described, but other embodiments can utilize fixed function hardware. Certain embodiments can combine both types of program code. An example of program code, also referred to as one or more programs or program instructions, is depicted in FIG. 9 as control facility 901. Other examples include one or more programs which can be stored in memory, such as read-only memory (ROM) 108, or random access memory (RAM) 110 in the processing circuit of FIG. 1, or memory 203 of the mobile electronic device embodiment of FIG. 2. Further examples are also described and illustrated herein.

Wireless charging of electronic devices using, for instance, electromagnetic induction continues to become more popular. Further, technologies exist to facilitate wireless transfer of power from one electronic device to another electronic device, such as from one mobile device to another mobile device. For instance, inductive power transfer (IPT) technology is one process that can be used to transfer power from one device to another wirelessly. In one implementation, IPT technology includes a power supply, primary winding, and a secondary winding, as well as a load. The induction system can be implemented using well known devices, including a transformer. The transformer can utilize a core to transfer power, while inductive coupling refers to induction between two coils, with an air-gap. The efficiency of inductive coupling technology today can vary based on distance. Wireless charging technology today has demonstrated a charging range of up to, for instance, 15 feet, in certain applications.

Within an environment, such as a residence, business, venue, building, structure, etc., there may be a variety of electronic devices at different states of charge. An issue with any wireless charging scenario, is that an electronic device requiring charging may be out of charge range for efficient wireless charging, and if so, the device either will not charge, or the effectiveness of the recharge will be reduced. In such a case, an individual typically manually moves the electronic device to within the optimum charging range of the device for charging, such as when an individual wishes to recharge a mobile electronic device, and the device is outside the wireless recharge range from a wireless recharging station. In such a case, the device remains at a reduced power level until moved to a location that is within the wireless charging range.

Aspects of one or more embodiments of the present invention address this issue by providing control processes that allow, for instance, an intelligent control system, such as a smart home controller or server, to deploy one or more other electronic devices, such as one or more self-propelled power relay devices with wireless charging capability, to move to an area within a charging range of the electronic device to be charged. In this manner, by deploying the self-propelled power relay device to the area within the recharge range of the electronic device, the device is able to be efficiently, wirelessly recharged without being manually moved to the wireless charging station. Further, in one or more implementations, the self-propelled power relay device can be configured to perform one or more activities within the area in parallel with recharging of the electronic device.

Figure 1:
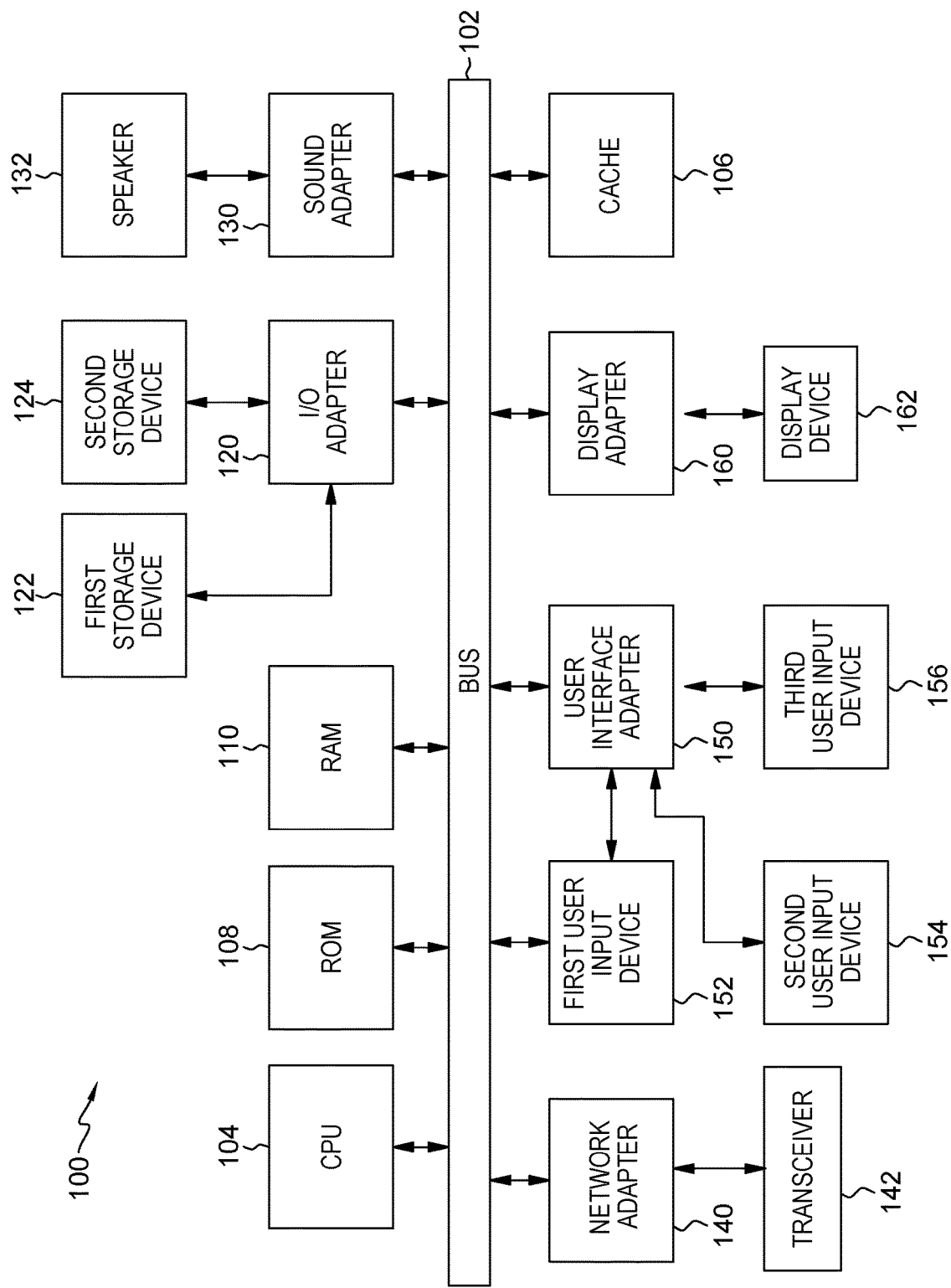
FIG. 1 depicts an exemplary processing system to incorporate one or more aspects of the present invention.

By way of example, FIG. 1 depicts one embodiment of a processing system 100, or control system, to incorporate one or more aspect of the present invention. Processing system 100 includes one or more processors (CPUs) 104 operatively coupled to other components via a system bus 102. A cache 106, a read-only memory (ROM) 108, a random access memory (RAM) 110, an input/output (I/O) adapter 120, a sound adapter 130, a network adapter 140, a user interface adapter 150, and a display adapter 160 can also be operatively coupled to the system bus 102.

In the illustrated embodiment, a first storage device 122 and a second storage device 124 are operatively coupled to system bus 102 by the I/O adapter 120. The storage devices 122, 124 can be any of a disk storage device (e.g., a magnetic or optical storage device), a solid state magnetic device, etc. The storage devices 122, 124 can be the same type of storage device, or different types of storage devices.

If desired, a speaker 132 can be operatively coupled to system bus 102 via sound adapter 130. A transceiver 142 can be operatively coupled to system bus 102 via network adapter 140, and a display device 162 is, in one embodiment, operatively coupled to system bus 102 by display adapter 160.

By way of example only, a first user input device 152, second user input device 154, and third user input device 156, can be operatively coupled to system bus 102, in one embodiment, by user interface adapter 150. User input devices 152, 154, 156, can be any of a keyboard, a mouse, a keypad, an image capture device, a motion-sensing device, a microphone, a device incorporating functionality of multiple ones of the preceding devices, etc. Other types of input devices can also be used, while maintaining the spirit of the present invention. Also, user input devices 152, 154, 156 can be the same type of user input device, or different types of user input devices. In one or more implementations, user input devices 152, 154 and 156 can be used to input and output information to and from processing system 100.

Note that processing system 100 can also include other elements (not shown), as can be readily contemplated by one of ordinary skill in the art, as well as omit certain elements noted above. For instance, various other input devices and/or output devices can be included, or excluded, from processing system 100, depending on the particular implementation, as will be understood by one of ordinary skill in the art. For instance, various types of wireless and/or wired input and/or output devices can be used. Moreover, additional processors, controllers, memories, etc., in various configurations, can also be utilized, as readily appreciated by one of ordinary skill in the art. These and other variations of the processing system 100 will be apparent to one of ordinary skill in the art in view of the discussion provided herein. In one or more implementations, processing system 100 is configured to implement one or more aspects of processing disclosed herein for facilitating wireless charging of one or more electronic devices within an environment.

Figure 2:
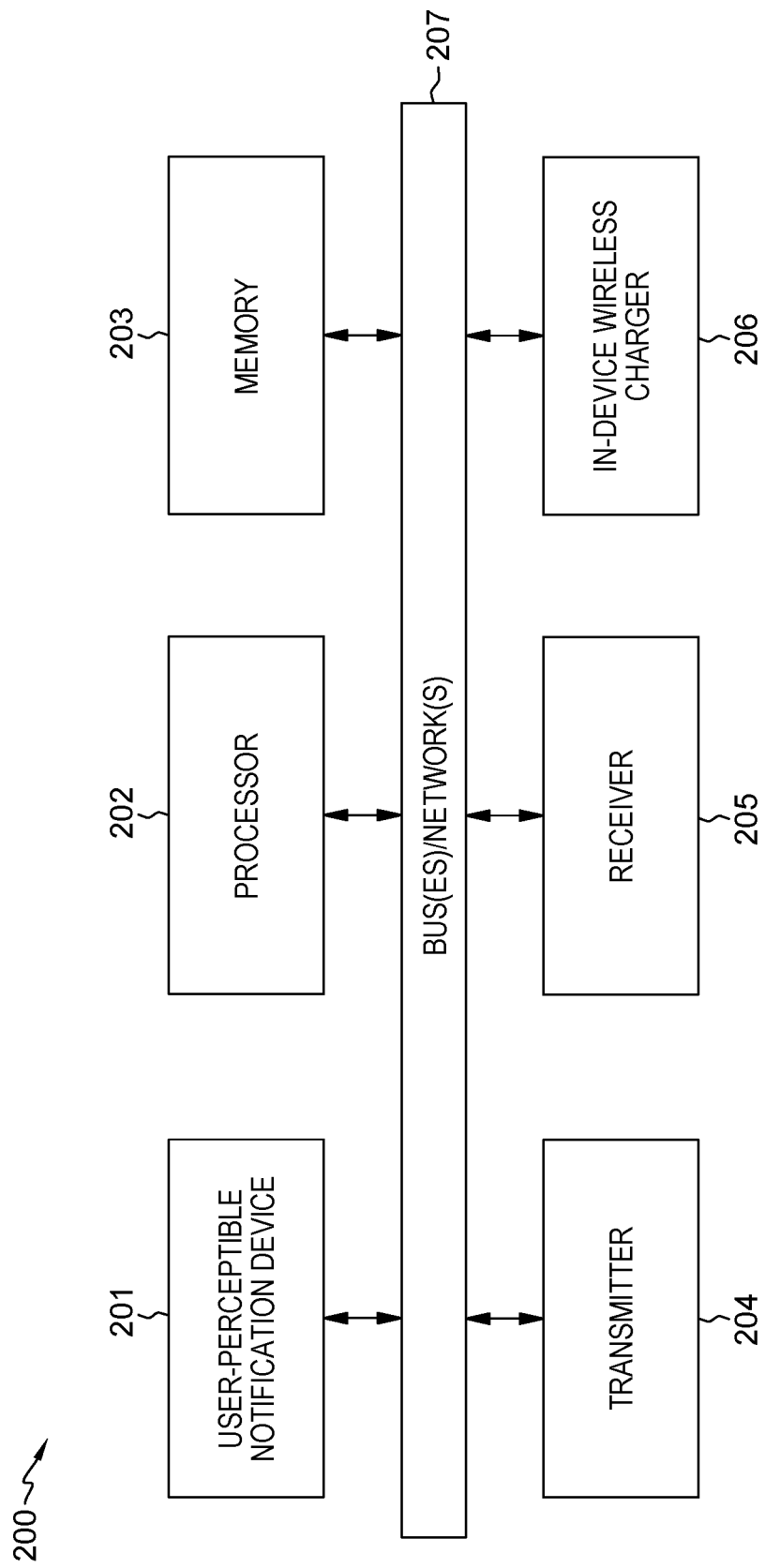
FIG. 2 depicts one embodiment of an electronic device to incorporate one or more aspects of the present invention.

By way of further example, FIG. 2 depicts one embodiment of an electronic device 200, such as a mobile electronic device, which can be configured with program code to facilitate one or more aspects of control system processing described herein. As illustrated, electronic device 200 includes, in one embodiment, a user-perceptible notification device 201 for providing notifications to a user, such as from, for instance, a service manager component, a power usage component, a power requirements predictor component, or from one or more other electronic devices, or from control system processing such as described herein, etc. User-perceptible notification device 201 can include, for instance, a display monitor, speaker, etc.

In the embodiment illustrated, electronic device 200 further includes one or more processors 202, one or more memories 203, one or more transmitters 204, one or more receivers 205, and an in-device wireless charging facility 206, which are in communication via one or more buses or networks 207. Those skilled in the art will note that other elements can be included in the electronic device, without departing from the scope of the present invention. For instance, in one or more embodiments, one or more transceivers can be used in place of separate transmitters and receivers in the electronic device.

In the embodiment illustrated, various components are in communication or interconnected via one or more buses or networks 207. In other embodiments, other types of connections can also be used. Note that the exemplary electronic device 200 of FIG. 2 is provided by way of example only, and that those skilled in the art will understand that there are many variations of electronic devices available which can be used in accordance with the concepts described herein.

Figure 3:
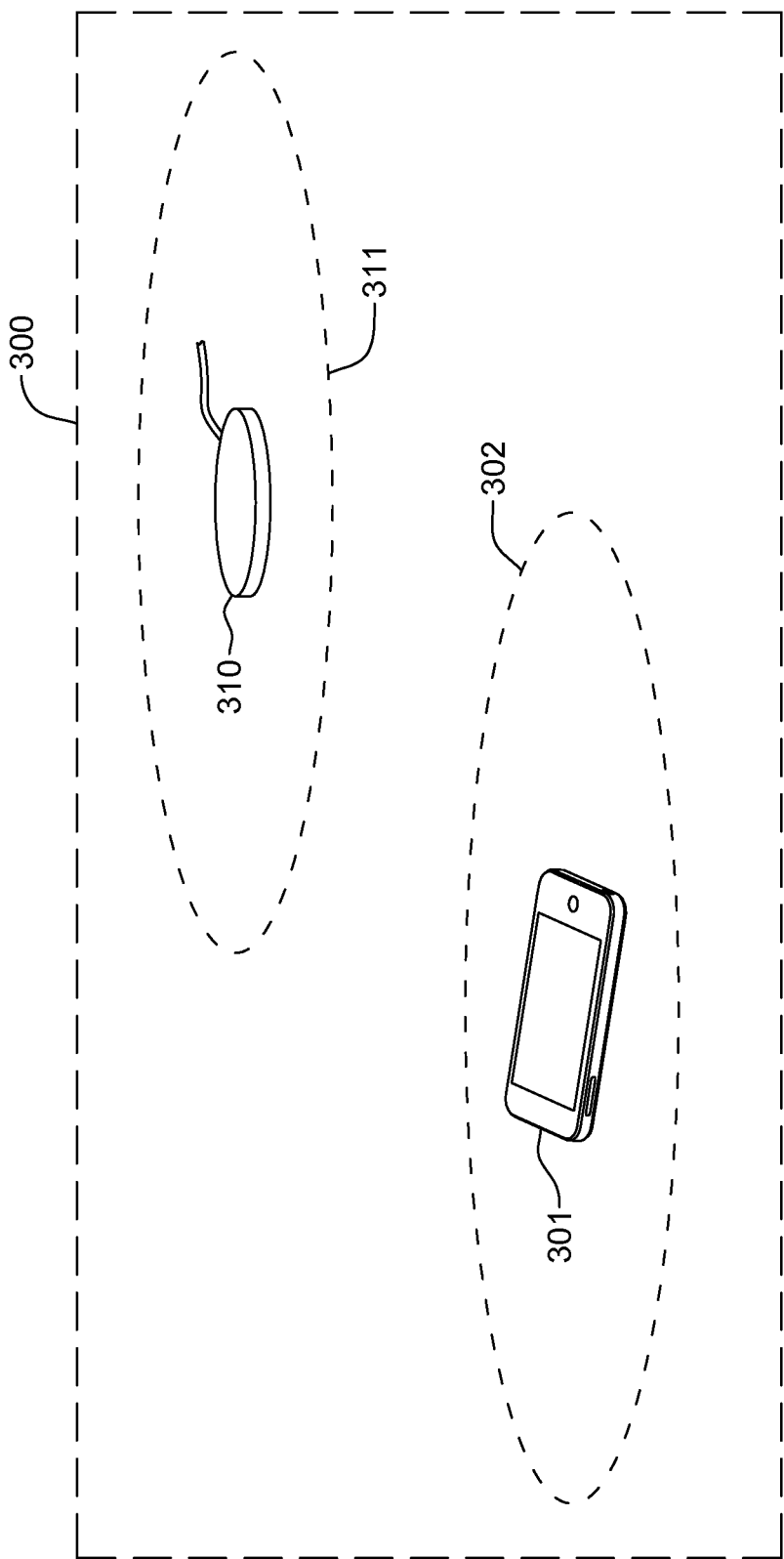
FIG. 3 illustrates an environment with an electronic device outside a charging range of a wireless charging station, and which is to be charged in accordance with one or more aspects of the present invention.

FIG. 3 illustrates an issue with a wireless charging scenario, which is addressed herein. In FIG. 3, an environment 300, such as a residence, business, venue, building, structure, etc., includes one or more electronic devices 301, each with a respective wireless charging range 302, as well as one or more wireless charging stations 310, each with a respective charging range 311. In the scenario of FIG. 3, the charging range 302 of electronic device 301 does not overlap charging range 311 of wireless charger 310, meaning that the electronic device 301 is unable to be wirelessly recharged in its current location within environment 300, or at least wireless charged efficiently within the environment, without being manually moved closer to charging station 310.

Figure 4:
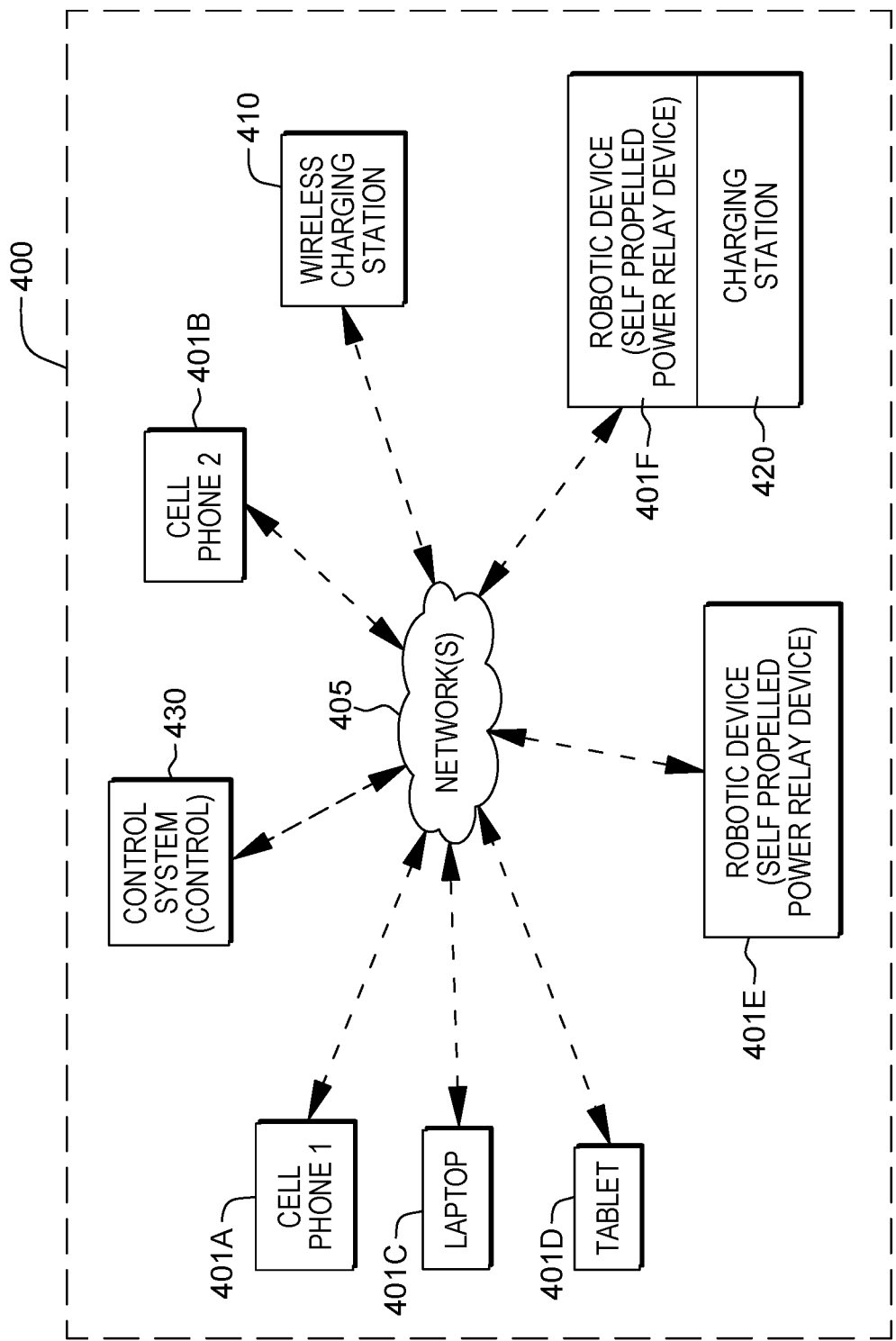
FIG. 4 is a block diagram depiction of an environment, including multiple electronic devices and a control system in communication via one or more networks, in accordance with one or more aspects of the present invention.

FIG. 4 depicts a more detailed embodiment of an environment 400, such as a residence, business, or other building or venue, with multiple electronic devices 401A-401F. In the example of FIG. 4, electronic devices 401E & 401F are robotic devices configured to perform an activity such as, for instance, cleaning a floor or perform an entertainment-related activity, as in the case of a robotic toy. Robotic devices 401E-401F are deployable, self-propelled power relay devices in this example, being capable of autonomous movement, and each is configured with wireless power-sharing capability. One or more fixed-position, wireless charging stations 410 are also present within environment 400 for wirelessly charging, for instance, electronic devices 401A-401D, and a charging station 420 can also be provided for charging electronic devices 401E & 401F. In one embodiment, charging station 420 can be, for instance, a plugin-type station where the respective self-propelled power relay devices dock into the charging station, or itself could also be a wireless charging station.

A control system 430 (or control) is provided in communication with one or more of the electronic devices 401A-401F to facilitate, in one embodiment, wireless charging of one or more of the electronic devices. Control system 430 includes, in one embodiment, program code executing on one or more computer resources, configured to facilitate one or more aspects of processing such as described herein. Control system 430 is in communication with one or more of electronic devices 401A-401F across one or more networks 405. Network(s) 405 can be, for instance, a telecommunications network a local-area network (LAN), a wide-area network (WAN), such as the Internet, or a combination thereof, and can include wired, wireless, fiber-optic connections, etc. Network(s) can include one or more wired and/or wireless networks that are capable of receiving and transmitting data, and control signals to implement processing such as described herein.

Note that in one or more embodiments, control system 430 can reside on a cognitive server, such as a smart home server, which can implement one or more engines, and can be, or utilize, for instance, a cloud-based system. One cognitive system that can be used is the IBM Watson IoT® system available from International Business Machines Corporation, of Armonk, New York (USA). (IBM and Watson IoT are registered trademarks of International Business Machines Corporation of Armonk, New York (USA) in one or more jurisdictions.) The IBM Watson IoT system is a cloud-based platform which features analytics and Watson application program interfaces (APIs) which can operate as a hub for an IoT system, obtain real-time analysis of user, machine, and system-generated data, and provide actual insight for, for instance, cognitive IoT applications.

By way of further example, control system 430 can utilize such cognitive capabilities to learn from historical data, such as what types of activities are performed by the self-propelled power relay device(s) within a given environment, and in what areas of the environment. Further, in one embodiment, control system 430 can utilize cognitive learning to predict when one or more of the electronic devices, including the self-propelled power relay devices, should undergo recharging. Note that in this example, it is assumed that electronic devices 401A-401D are non-self-propelled or non-autonomous devices and would otherwise require an individual to move the device(s) to within range of wireless charging station 410, in order for the device to be wirelessly recharged.

Addressing this issue, control system 430 is configured to dynamically deploy one or more self-propelled power relay devices 401E-401F within the environment to within a charging range of one of the electronic devices 401A-401D requiring charging, so that the device can be recharged wirelessly, without being manually moved. In certain embodiments, the self-propelled power relay device is configured to perform an activity which can advantageously occur in parallel with recharging of the electronic device.

Figure 5A:
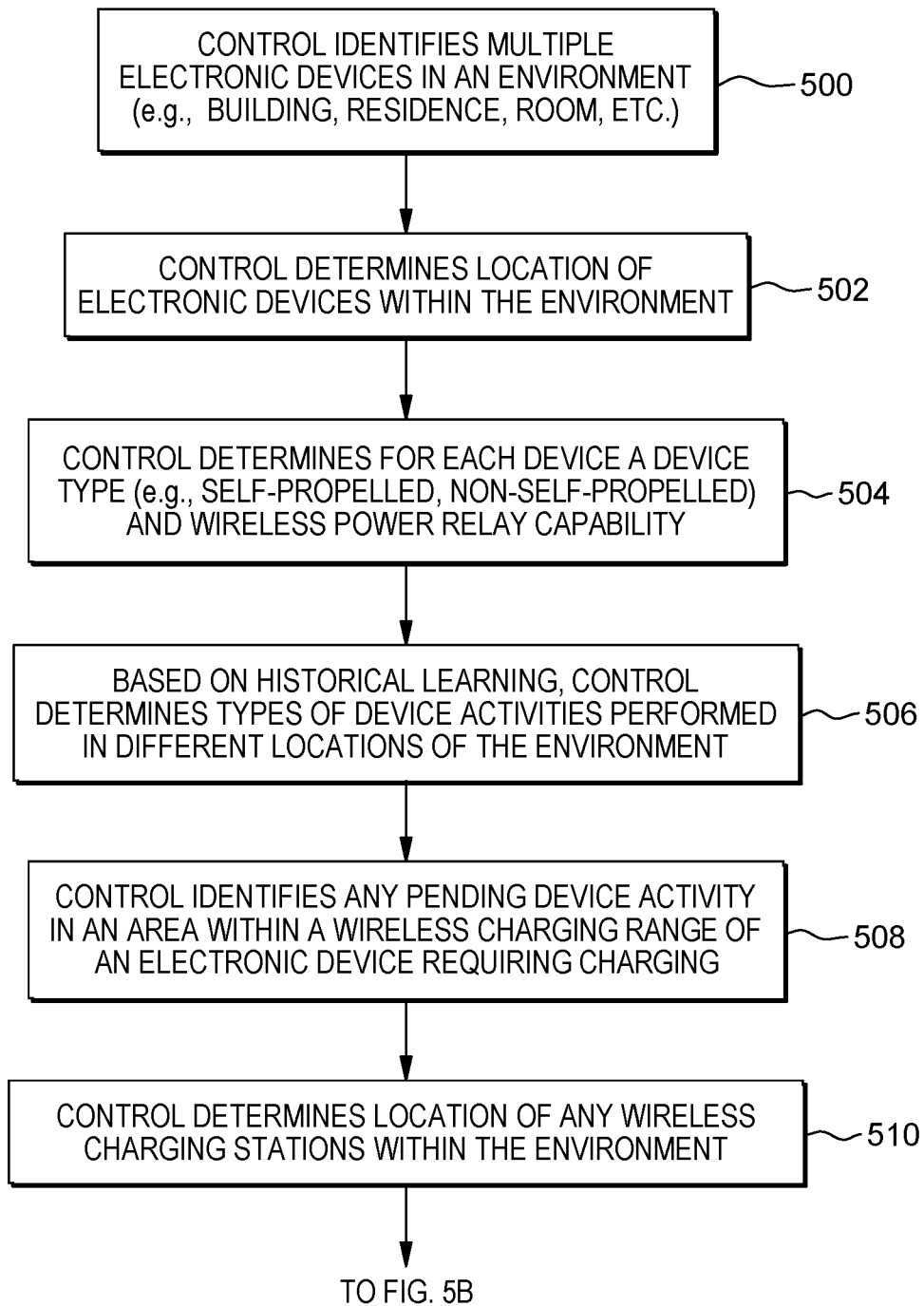
FIGS. 5A-5B depict one embodiment of a workflow illustrating certain aspects of one or more embodiments of the present invention.
Figure 5B:
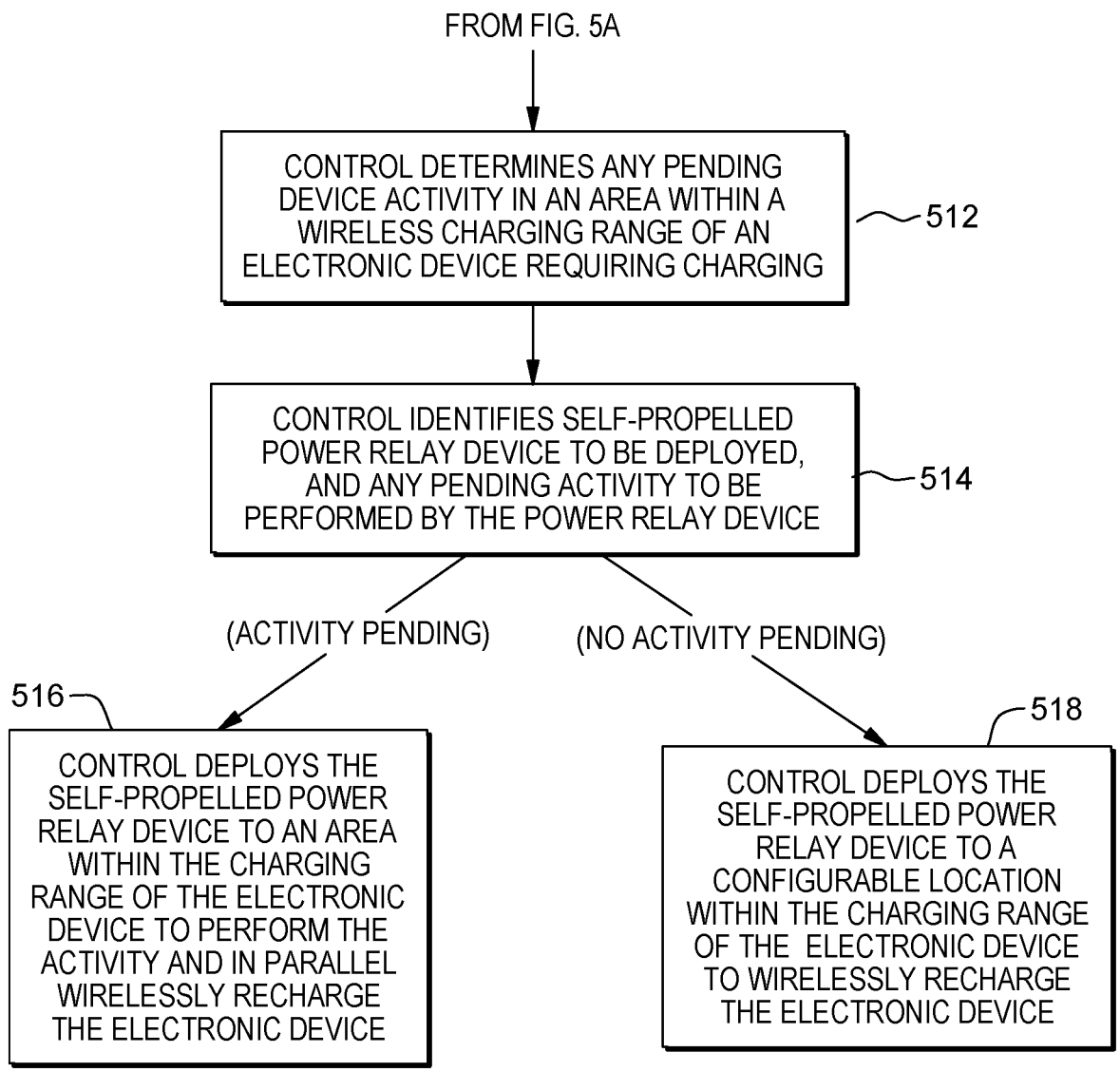

FIGS. 5A-5B depict one embodiment of a workflow illustrating certain aspects of some embodiments of the present invention.

Referring to FIG. 5A, a control or control system 500 is configured to identify electronic devices within an environment, such as a residence, room, etc., and to determine physical location of the devices within the environment 502. The control is further programmed, in one embodiment, to determine for each device, a device type (that is, whether self-propelled or non-self-propelled) and a wireless power relay capability 504. For instance, in one or more embodiments, the control, such as a smart home server, is configured to identify electronic devices within the environment that can receive wireless charge, and/or that can provide wireless charge. Further, the control is configured to identify which of the electronic devices are non-self-propelled, such as cell phones, smartwatches, etc., and to identify which electronic devices have mobility, that is, are self-propelled, such as a floor-cleaning robot, robotic toy, powered skateboard, robotic tea table, etc. Further, in one or more implementations, the control is configured to identify power capacities of the different electronic devices, such as battery capacity, wireless charge coverage area, etc.

In one embodiment, based (for instance) on historical learning, the control determines types of device activities performed in different locations of the environment 506. For instance, in one implementation, the control can identify electronic devices by the purpose of the activities, such as floor-cleaning robot to clean the floor, etc. In one embodiment, metadata of the devices can be used by the system to identify activity specifications, and recharge capability for other devices. Devices can also be identified by how long it takes for recharging of each device, and the minimum power thresholds for the devices. In one or more implementations, the control system obtains a list of preprogrammed activities of the self-propelled devices (e.g., clear main room at 6:00 AM, etc.). Additionally, in one embodiment, the control system can identify how long it takes to perform a particular activity, such as cleaning a floor. Further, the control is configured to identify any pending device activity in an area within a wireless charging range of an electronic device requiring charging 508. For instance, an activity in the area can include cleaning the floor by a robotic device with power relay capability. The control further is configured to identify or determine the location of any wireless charging stations within the environment 510.

In one or more embodiments, the control is further programmed to determine available power of the electronic devices, and how long is required to charge each device. In any environment, the position of the devices, such as the indoor position of the devices, is ascertained, along with the amount of power required to recharge each device. In one implementation, the control identifies a position of each device, and whether the device is out of wireless recharge range, or whether another enough wireless recharging bandwidth is available. Based on the required amount of power to recharge, the control is programmed to identify time to recharge, and identify the position of each electronic device within the environment.

Figure 6A:
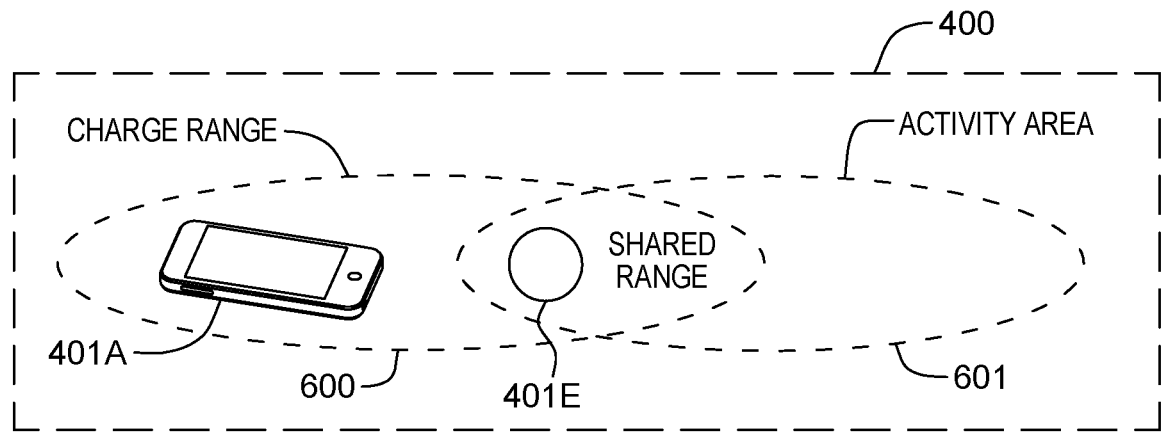
FIGS. 6A & 6B illustrate examples of facilitating wireless charging of an electronic device, in accordance with one or more aspects of the present invention.

Referring to FIG. 5B, the control determines any pending device activity in an area within a wireless charging range of an electronic device requiring charging 512. The control system identifies a self-propelled power relay device to be deployed, and any pending activity to be performed by the power relay device 514. In one embodiment, the control is configured to identify the time required to perform the activity, such as how much time is required to clean the floor within the area.

Where there is an activity pending to be performed by the self-propelled power relay device, the control deploys the self-propelled power relay device to an area within the charging range of the electronic device to perform the activity, and in parallel, to wirelessly recharge the electronic device 516. An example of this is depicted in FIG. 6A, where electronic device 401A within environment 400 is to undergo wireless charging. Electronic device 401A has a wireless charge range 600 that is initially assumed not to overlap with any wireless charger within with the environment. In this case, the control deploys self-propelled power relay device 401E to a location within the wireless charge range 600 of electronic device 401. In one or more implementations, self-propelled power relay device 401E has an activity area 601 which overlaps, at least in part, with the wireless charge range of electronic device 401A, and in this case, the control is configured to instruct self-propelled power relay device to remain within the shared range for either a period of time or until electronic device 401A has reached a desired charge threshold.

Figure 6B:
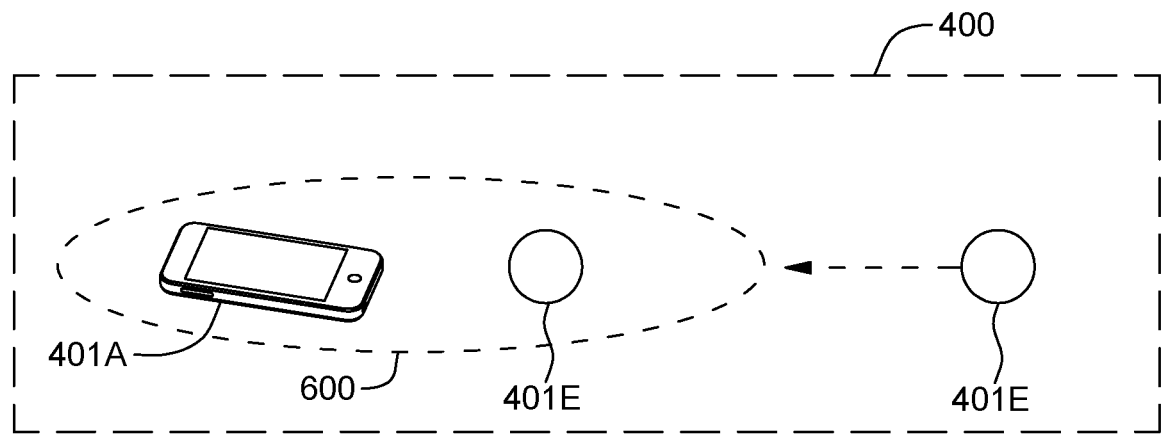

As depicted in FIG. 5B, where the control determines that no activity is currently pending for the self-propelled power relay device, then the control can deploy the self-propelled power relay device to a configurable location within the charging range of the electronic device to wirelessly recharge the electronic device 518. An example of this is depicted in FIG. 6B, where self-propelled power relay device 401E is deployed to an area of environment 400 within wireless charge range 600 of electronic device 401A to allow the self-propelled power relay device 401E to wirelessly charge electronic device 401A. In one or more implementations, the control can deploy the self-propelled power relay device to a configurable location within environment 400, such as, for instance, to a location under a table or other out-of-the-way location, in order that (for instance) the self-propelled power relay device 401E is outside an area where an individual is likely to walk within the environment.

Figure 7A:
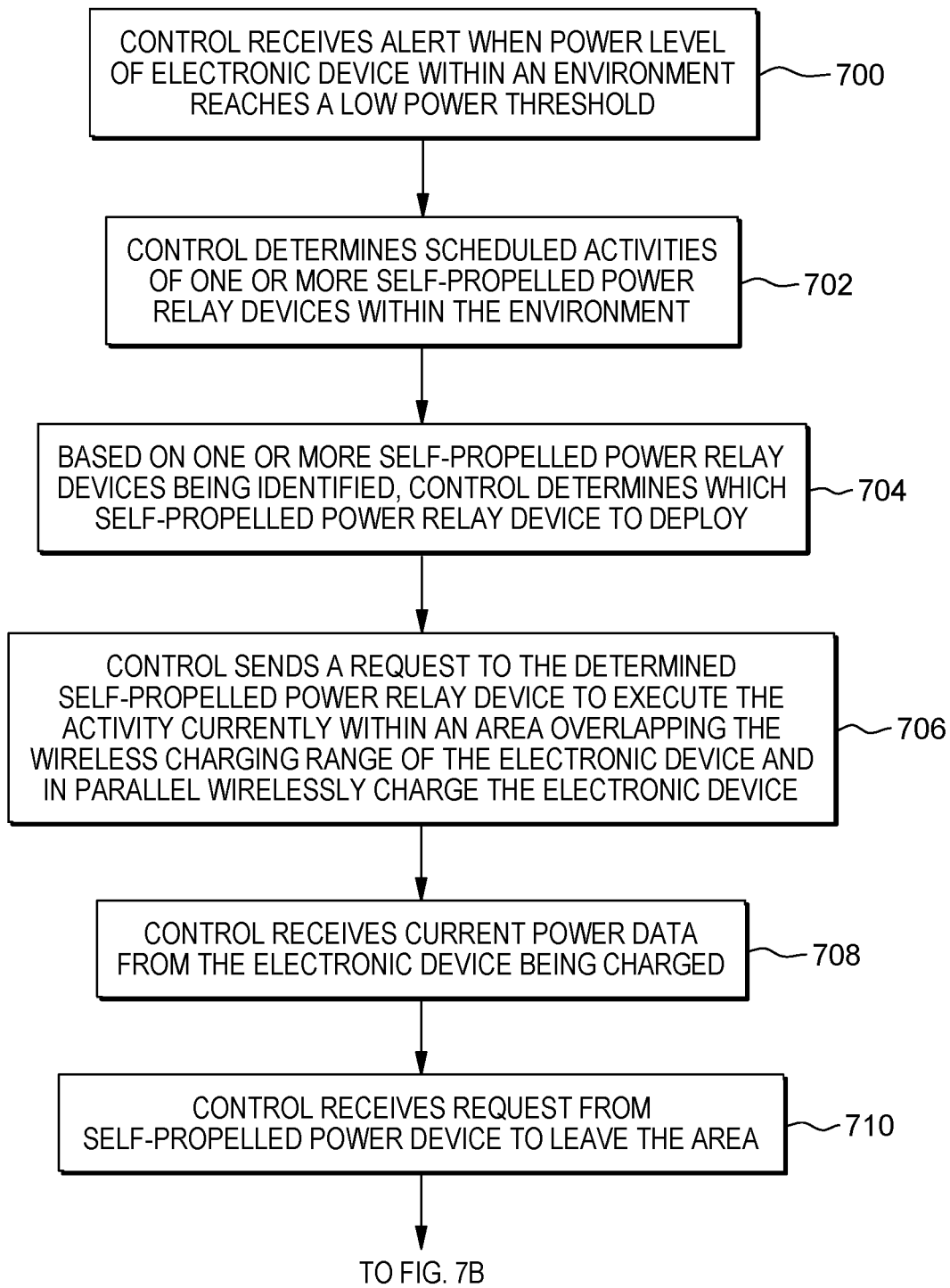
FIGS. 7A-7C depict another embodiment of a workflow illustrating certain aspects of one or more embodiments of the present invention.
Figure 7B:
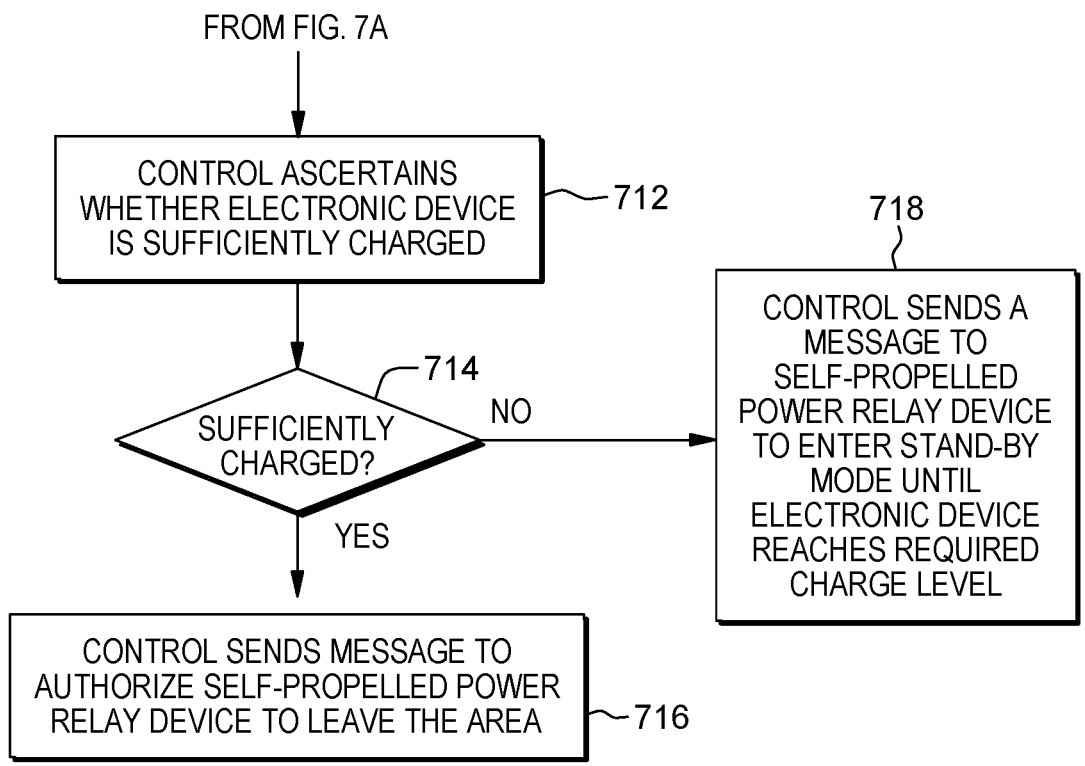
Figure 7C:
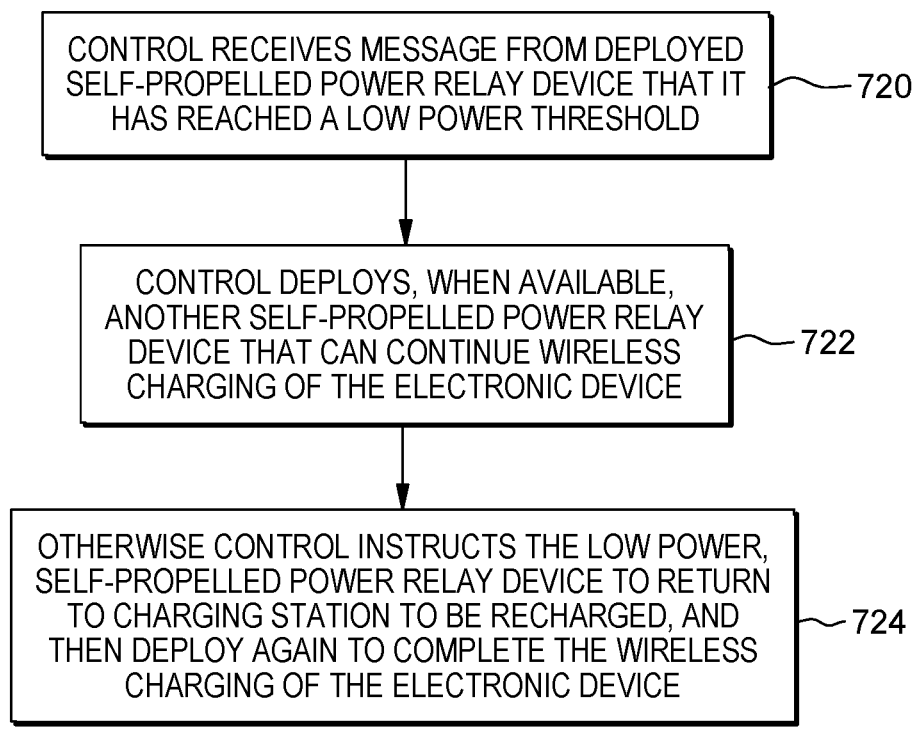

FIGS. 7A-7C depict another embodiment of a workflow illustrating certain aspects of some embodiments of the present invention. In one or more implementations, the control system, or control, resides on or is associated with, for instance, an Internet of Things controller, such as a smart home server, with supplemental program code provided on one or more of the electronic devices at issue to facilitate processing such as described herein. Note, however, that this is one example only. In one or more other implementations, the control system or control can be a distributed control within the environment, with one or more aspects disclosed herein residing on one or more electronic devices or other computing resources within the environment, or even remote from the environment, such as in the case of a cloud-based implementation.

As illustrated in FIG. 7A, in one embodiment, the control receives an alert when a power level of an electronic device within an environment monitored by the control reaches a low power threshold 700. The electronic device at issue is assumed to be non-self-propelled, and the low threshold power level can vary based on the application, and device. For instance, in one embodiment, the low power threshold can be 10%, 20%, or any other configurable percentage of full charge desired for a particular electronic device within the environment.

The control determines any scheduled activities of one or more self-propelled power relay devices within the environment 702. For instance, in one embodiment, the control polls the activities of the devices within the environment with self-propelled or autonomous movement capabilities, as well as power-sharing capabilities. For instance, the device can be a robotic device, where the activity at issue is to perform a task, such as clean the floor of a room at one or more scheduled times a day.

Based on more than one self-propelled power relay device being identified, the control determines which self-propelled power relay device to deploy 704. For instance, if more than one deployable device is found, the control system considers (in one embodiment) the power level of each deployable device, the time of the next scheduled activity of each deployable device, the proximity of the electronic device to be charged, and the area in which the deployable device will be deployed to perform the scheduled activity.

The control system sends a request to the determined self-propelled power relay device to deploy and execute the activity within an area overlapping the wireless charge range of the electronic device 706. For instance, in one or more implementations, the control deploys the identified self-propelled power relay device to execute a scheduled activity or task earlier than scheduled, and/or to execute the activity or task using a movement pattern within an area that overlaps the wireless charge range of the electronic device to be charged. For example, were the self-propelled power relay device is a floor cleaning device, the area of the floor to be cleaned can be dynamically altered to only that area within the wireless charging range of the electronic device.

As illustrated, in one embodiment, the control receives current power data from the electronic device being charged 708, and before the self-propelled power relay device leaves the charging range, it sends a request to the control to allow it to leave the area 710. As shown in FIG. 7B, in one embodiment, the control determines whether the electronic device is sufficiently charged 712. For instance, the control determines whether the charge level of the electronic device has reached a required power threshold, in one embodiment. Where the electronic device is sufficiently charged 714, the control sends a message to the self-propelled power relay device authorizing the device to leave the area 716. Otherwise, where the electronic device is insufficiently charged 714, the control can send a message to the self-propelled power relay device to enter a standby mode within the recharge area of the electronic device until the electronic device reaches the required power threshold. In one implementation, in a standby mode, the self-propelled power relay device can continue to relay power wirelessly to the electronic device, but may have discontinued performing the activity within the area. The self-propelled power relay device can also be configured to switch to another mode while on standby, for instance, to provide enhanced cleaning to an area of the environment in the case where the device is a floor cleaning device.

FIG. 7C depicts another embodiment of a workflow illustrating certain aspects of some embodiments of the present invention. In this workflow, a self-propelled power relay device detects and sends a message to the control that it has reached a low power threshold 720. In one or more embodiments, this low power threshold, can be based on power required for the deployable device to return back to its charger station, plus a given percentage to, for instance, accommodate for any variances. The control can be configured to then deploy, when available, another self-propelled power relay device that can continue wireless charging of the electronic device 722. Otherwise, the control can be configured to instruct the low power, self-propelled power relay device to return to its charging station to be recharged, after which to again deploy to the area within the recharge range of the electronic device to complete wirelessly recharging of the device.

Those skilled in the art will understand from the description provided that numerous advantages are provided by control processing such as disclosed herein. Advantageously, one or more self-propelled power relay devices can be dynamically deployed within an environment so that wireless power can be relayed to an electronic device requiring charge via the deployed device. Based on the contextual situation, the control can, in certain embodiments, dynamically identify which self-propelled power relay device to deploy or rearrange in the environment for extending the wireless recharge boundary. In one or more implementations, the repositioned, self-propelled power relay device is also configured to perform an activity or task, such as cleaning the floor around the device requiring power, which is performed in parallel with providing wireless recharging. In one or more implementations, the control can identify the power recharge needs of multiple electronic devices within the environment and position the self-propelled power relay device in an area of the environment based on, for instance, activities required within that area. In this manner, any scheduled activity can be performed by the deployable device, as well as a wireless recharging of the electronic device(s) requiring charge. If no activity is required or scheduled within the recharge range of the electronic device to be charged, then the control system can deploy the self-propelled power relay device to a location within the recharge area while ensuring that the device is not creating an obstacle, to avoid causing an accident.

By way of further example, in one embodiment, the control system, which can be implemented in one or more of the devices at issue, communicates with an electronic device, such as a smartphone, smartwatch, etc., requiring charging, in the case where the device is outside the recharge range from a wireless charging station or port. In such a case, the control, in one embodiment, broadcasts a message to nearby devices to identify an electronic device which has autonomous movement capabilities, wireless charge sharing capability, and has sufficient power to fulfill a task or activity, as well as to facilitate recharge of the electronic device needing charge. If the identified device has insufficient power, then the control system can direct the device to go to its base charging station, and once charged, then to deploy to the desired area in order to facilitate powering the electronic device needing power.

In another implementation, where the self-propelled power relay device is performing an activity near the electronic device requesting charge, for instance, cleaning a floor, then the self-propelled device can perform the task, while in charging range of the electronic device requiring charge, and thereby, also provide charging to the electronic device. Should the requesting electronic device still not have sufficient charge, then the control system can, in one embodiment, postpone part of the deployable device's activity until the charging device reaches its desired power level.

In the case where there is more than one self-propelled power relay device within an environment available to be deployed, the control system can obtain data, such as a list of scheduled tasks to be performed by each of the deployable devices, and then based on context, the control system can determine which device is the most suitable device to provide the charge. For instance, for three self-propelled power relay devices, Device 1 may have no activities schedule for the day, Device 2 can have a cleaning activity in a main room scheduled in 60 minutes, and Device 3 can have a cleaning activity at a second floor scheduled in 20 minutes. In this scenario, and assuming that the electronic device to be charged is in the main room, then the control system deploys Device 2 currently to start the scheduled activity earlier than schedule. Note that in this case, Device 3 is not deployed, even though its task is scheduled sooner, since its location within the environment is not within the charging range of the device in the main room.

Those skilled in the art will note from the description provided herein that, in one or more embodiments, a computer-implemented process for dynamically deploying a secondary device to relay wireless recharge to another electronic device is advantageously provided. In one implementation, the computer-implemented process includes receiving, for each device in a predetermined area or environment, a set of attributes including a capability of at least one of receiving a wireless charge and delivering a wireless charge, a type of one of static or dynamic (i.e., non-self-propelled or self-propelled), a charge capacity, a purpose, a recharge duration, a minimum power threshold level, a current charge level, any preprogrammed activities of the respective device, and time require to complete an activity. Further, the computer-implemented process determines a current location of each device within the environment, and in response to identifying a device requiring charge, determines a distance from a recharging station. In response to determining that the electronic device identified for recharge is outside a range of the recharging station, the control computes the recharge duration required. In response to identifying any pending activities in the environment to be performed by one or more deployable devices, where the device identified is present and needs power, the control identifies a dynamic device or deployable device to perform a pending activity in that area. The process can identify, in one embodiment, the time required to perform the activity by the deployable device identified. In response to identifying that one or more activities are required within the area, processing deploys the deployable or dynamic device to perform the one or more activities in the predetermined area, and uses the deployable device as a relay device for wirelessly recharging in parallel the electronic device requiring charge. In response to identifying no activities are required, processing can deploy the dynamic device to a configurable, predetermined location within the environment within the wireless recharge range of the electronic device to function as a relay device to transfer wirelessly power to the electronic device.

FIGS. 8A-8B depict a further embodiment of control code processing, in accordance with one or more aspects of the present invention.

Referring to FIG. 8A, control processing executing on one or more processors includes processing to identify presence of multiple electronic devices within an environment, where the multiple electronic devices include a self-propelled power relay device with wireless charging capability 800. The processing further determines that an electronic device of the multiple electronic devices requires charging 802, and based on determining that an electronic device requires charging, deploys the self-propelled power relay device to move to an area of the environment within a charging range of the electronic device to facilitate wireless charging of the electronic device via the self-propelled power relay device 804.

In one or more embodiments, the deploying is further based on determining that the electronic device is outside the charging range from a wireless charging station, and the electronic device is a non-self-propelled electronic device 806.

In one or more embodiments, the self-propelled power relay devices is a robotic device configured to perform an activity, and the method further includes deploying the self-propelled power relay device to perform the activity within the area of the environment in parallel with facilitating wireless charging of the electronic device 808. In one embodiment, the multiple electronic devices within the environment include at least two self-propelled power relay devices with wireless charging capability, and the method further includes identifying the self-propelled power relay device from the at least two self-propelled power relay devices to deploy to the area of the environment to perform the activity within the area in parallel with facilitating wireless charging of the electronic device 810.

Referring to FIG. 8B, in one embodiment, the method further includes determining current locations of the multiple electronic devices within the environment, and the deploying is further based on determining that the electronic device is outside the charging range from a wireless charging station 812.

In one or more implementations, the deploying further includes deploying the self-propelled power relay device to a configurable, predetermined location within the area of the environment in the charging range of the electronic device 814. In one embodiment, the self-propelled power relay device is a robotic device configured to perform an activity, and the deploying of the self-propelled power relay device to the configurable, predetermined location is further based on determining that the self-propelled power relay device is not currently required to perform the activity within the area 816.

In one or more implementations, the process further includes receiving a set of attributes for each electronic device within a predetermined area of the environment of the multiple electronic devices identified. The set of attributes is selected from a group consisting of: a capability of receiving a wireless charge, a capability of delivering a wireless charge, whether the electronic device is a self-propelled power relay device, whether the electronic device is a robotic device schedule to perform an activity, a minimum power threshold of the electronic device, a current power charge, one or more preprogrammed activities of the electronic device, and time required to complete each preprogrammed activity 818. In one embodiment, the environment is a building, and the identifying, the determining, and the deploying are performed by an intelligent control system of the building 820.

Further exemplary embodiments of a computing environment to implement one or more aspects of the present invention are described below with reference to FIGS. 9-11.

By way of further example, FIG. 9 depicts one embodiment of a computing environment 900, which includes a computing system 912. Examples of well-known computing systems, environments, and/or configurations that may be suitable for use with computer system 912 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 912 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 9, computing system 912, is shown in the form of a general-purpose computing device. The components of computing system 912 can include, but are not limited to, one or more processors or processing units 916, a system memory 923, and a bus 918 that couples various system components including system memory 923 to processor 916.

In one embodiment, processor 916 can be based on the z/Architecture® offered by International Business Machines Corporation, or other architectures offered by International Business Machines Corporation or other companies.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 912 can include a variety of computer system readable media. Such media may be any available media that is accessible by computing system 912, and it includes both volatile and non-volatile media, removable and non-removable media.

System memory 923 can include computer system readable media in the form of volatile memory, such as random access memory (RAM) 930 and/or cache memory 932. Computing system 912 can further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 918 by one or more data media interfaces. As described below, memory 923 can include at least one program product having a set (e.g., at least one) of program modules or code that are configured to carry out the functions of embodiments of the invention.

Program/utility 940, having a set (at least one) of program modules 942, can be stored in memory 932 by way of example, and not limitation, as well as an operating system, one or more application programs, other program modules, and program data. Each of the operating system, one or more application programs, other program modules, and program data or some combination thereof, can include an implementation of a networking environment. Program modules 942 generally carry out the functions and/or methodologies of embodiments of the invention as described herein. Alternatively, a control facility, module, logic, etc., 901 can be provided within computing environment 912, as disclosed herein.

Computing system 912 can also communicate with one or more external devices 914 such as a keyboard, a pointing device, a display 924, etc.; one or more devices that enable a user to interact with computing system 912; and/or any devices (e.g., network card, modem, etc.) that enable computing system 912 to communicate with one or more other computing devices. Such communication can occur via Input/Output (I/O) interfaces 922. Still yet, computing system 912 can communicate with one or more networks such as a local area network (LAN), a general wide area network (WAN), and/or a public network (e.g., the Internet) via network adapter 920. As depicted, network adapter 920 communicates with the other components of computing system, 912, via bus 918. It should be understood that although not shown, other hardware and/or software components could be used in conjunction with computing system 912. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 9. Computer system/server 912 of FIG. 9 can be practiced in distributed cloud computing environments where tasks are performed by remote processing devices that are linked through a communications network. In a distributed cloud computing environment, program modules may be located in both local and remote computer system storage media including memory storage devices. Computer system/server 912 is capable of being implemented and/or performing any of the functionality set forth hereinabove.

Figure 10:
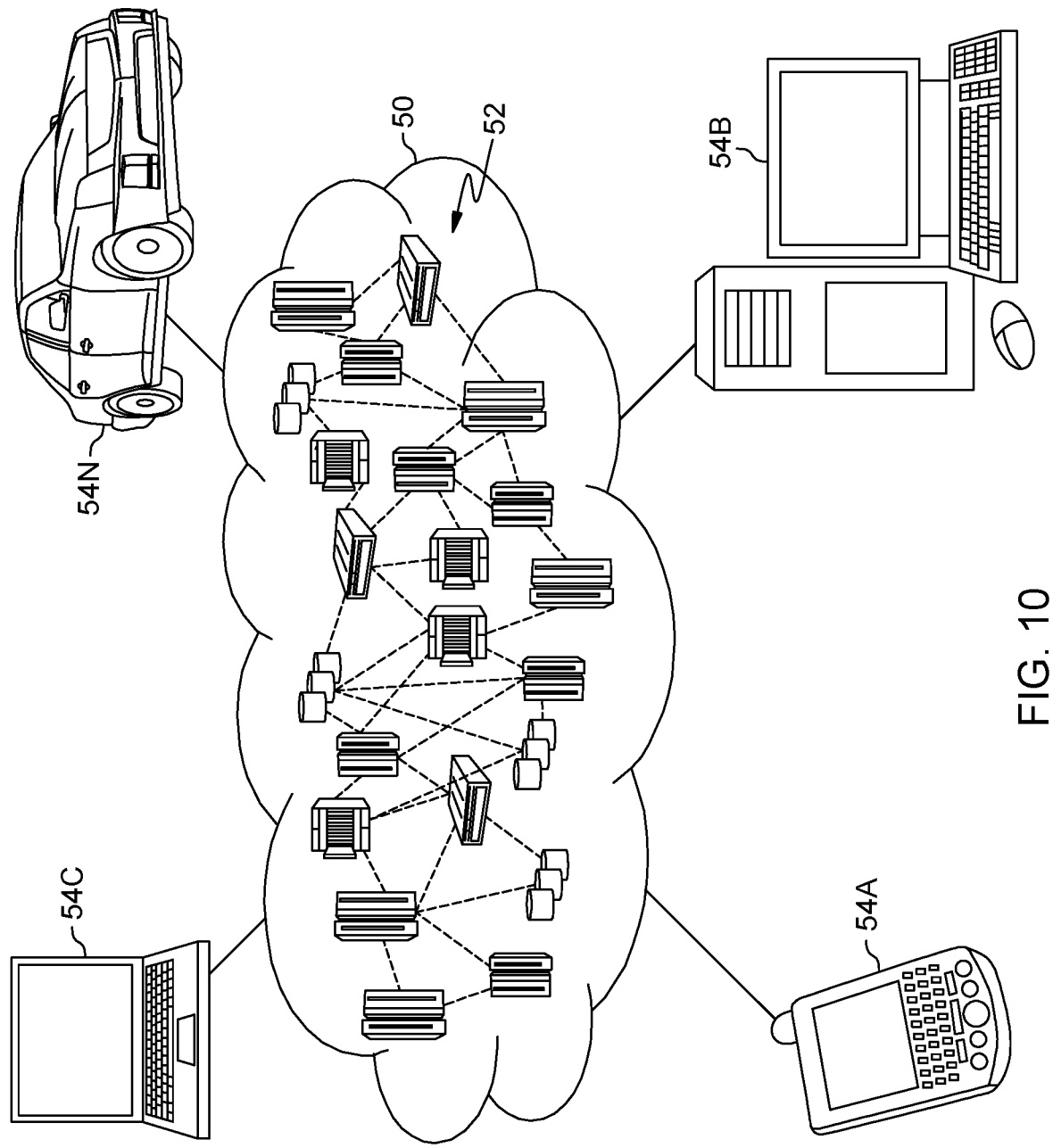
FIG. 10 depicts one embodiment of a cloud computing environment, in accordance with one or more aspects of the present invention.

Referring now to FIG. 10, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 11:
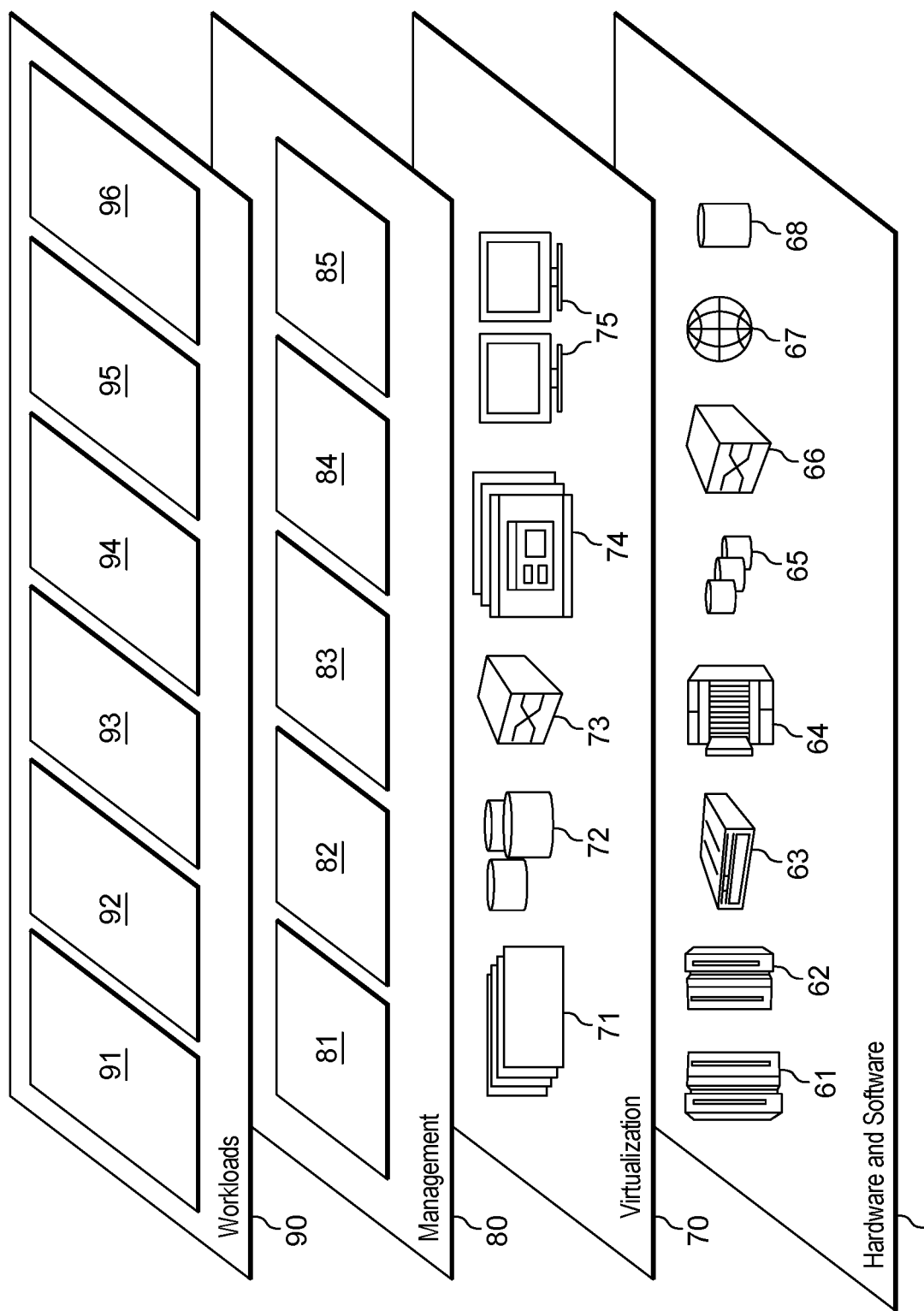
FIG. 11 depicts one example of abstraction model layers, in accordance with one or more aspects of the present invention.

Referring to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and control processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer program product for facilitating charging of an electronic device, the computer program product comprising:
at least one computer-readable storage medium having program instructions embodied therewith, the program instructions being readable by a processing circuit to cause the processing circuit to perform a method comprising:
identifying presence of multiple electronic devices within an environment, the multiple electronic devices including a self-propelled power relay device with wireless charging capability;
determining that an electronic device of the multiple electronic devices requires charging;
determining that the self-propelled power relay device is not currently required to perform an activity; and
based on the determining that the electronic device requires charging and based on the determining that the self-propelled relay device is not currently required to perform the activity, deploying the self-propelled power relay device to move to an area of the environment within a charging range of the electronic device to facilitate wireless charging of the electronic device via the self-propelled power relay device.

2. The computer program product of claim 1, wherein the deploying is further based on determining that the electronic device is outside the charging range from a wireless charging station, and wherein the electronic device is a non-self-propelled electronic device.

3. The computer program product of claim 1, wherein the self-propelled power relay device is a robotic device configured to perform an activity, and wherein the method further comprises deploying the self-propelled power relay device to perform the activity within the area of the environment in parallel with facilitating wireless charging of the electronic device.

4. The computer program product of claim 3, wherein the multiple electronic devices within the environment include at least two self-propelled power relay devices with wireless charging capability, and wherein the method further comprises identifying the self-propelled power relay device from the at least two self-propelled power relay devices to deploy to the area of the environment to perform the activity within the area in parallel with facilitating wireless charging of the electronic device.

5. The computer program product of claim 3, further comprising determining current locations of the multiple electronic devices within the environment, and wherein the deploying is further based on determining that the electronic device is outside the charging range from a wireless charging station.

6. The computer program product of claim 1, wherein the deploying further comprises deploying the self-propelled power relay device to a configurable, predetermined location within the area of the environment in the charging range of the electronic device.

7. The computer program product of claim 6, wherein the self-propelled power relay device is a robotic device configured to perform the activity, and wherein the deploying of the self-propelled power relay device to the configurable, predetermined location is further based on the determining that the self-propelled power relay device is not currently required to perform the activity within the area.

8. The computer program product of claim 1, further comprising receiving a set of attributes for each electronic device within a predetermined area of the environment of the multiple electronic devices identified, the set of attributes being selected from the group consisting of: a capability of receiving a wireless charge, a capability of delivering a wireless charge, whether the electronic device is a self-propelled power relay device, whether the electronic device is a robotic device scheduled to perform an activity, a minimum power threshold of the electronic device, a current power charge, one or more preprogrammed activities of the electronic device, and time required to complete each preprogrammed activity.

9. The computer program product of claim 1, wherein the environment is a building, and the identifying, the determining, and the deploying are performed by an intelligent control system of the building.

10. A computer system for facilitating charging of an electronic device, the computer system comprising:
a memory; and
a processing circuit in communication with the memory, wherein the computer system is configured to perform a method, the method comprising:
identifying presence of multiple electronic devices within an environment, the multiple electronic devices including a self-propelled power relay device with wireless charging capability;
determining that an electronic device of the multiple electronic devices requires wireless charging;
determining that the self-propelled power relay device is not currently required to perform an activity; and
based on the determining that the electronic device requires wireless charging and based on the determining that the self-propelled relay device is not currently required to perform the activity, deploying the self-propelled power relay device to move to an area of the environment within a charging range of the electronic device to facilitate wireless charging of the electronic device via the self-propelled power relay device.

11. The computer system of claim 10, wherein the deploying is further based on determining that the electronic device is outside the charging range from a wireless charging station, and wherein the electronic device is a non-self-propelled electronic device.

12. The computer system of claim 10, wherein the self-propelled power relay device is a robotic device configured to perform an activity, and wherein the method further comprises deploying the self-propelled power relay device to perform the activity within the area of the environment in parallel with facilitating wireless charging of the electronic device.

13. The computer system of claim 12, wherein the multiple electronic devices within the environment include at least two self-propelled power relay devices with wireless charging capability, and wherein the method further comprises identifying the self-propelled power relay device from the at least two self-propelled power relay devices to deploy to the area of the environment to perform the activity within the area in parallel with facilitating wireless charging of the electronic device.

14. The computer system of claim 12, further comprising determining current locations of the multiple electronic devices within the environment, and wherein the deploying is further based on determining that the electronic device is outside the charging range from a wireless charging station.

15. The computer system of claim 10, wherein the deploying further comprises deploying the self-propelled power relay device to a configurable, predetermined location within the area of the environment in the charging range of the electronic device.

16. The computer system of claim 15, wherein the self-propelled power relay device is a robotic device configured to perform the activity, and wherein the deploying of the self-propelled power relay device to the configurable, predetermined location is further based on the determining that the self-propelled power relay device is not currently required to perform the activity within the area.

17. A computer-implemented process comprising:
identifying, by one or more processors, presence of multiple electronic devices within an environment, the multiple electronic devices including a self-propelled power relay device with wireless charging capability;
determining, by the one or more processors, that an electronic device of the multiple electronic devices requires wireless charging;
determining, by the one or more processors, that the self-propelled power relay device is not currently required to perform an activity; and
based on the determining that the electronic device requires wireless charging and based on the determining that the self-propelled relay device is not currently required to perform the activity, deploying the self-propelled power relay device to move to an area of the environment within a charging range of the electronic device to facilitate wireless charging of the electronic device via the self-propelled power relay device.

18. The computer-implemented process of claim 17, wherein the self-propelled power relay device is a robotic device configured to perform an activity, and wherein the process further comprises deploying the self-propelled power relay device to perform activity within the area of the environment in parallel with facilitating wireless charging of the electronic device.

19. The computer-implemented process of claim 17, wherein the deploying further comprises deploying the self-propelled power relay device to a configurable, predetermined location within the area of the environment in the charging range of the electronic device.

20. The computer-implemented process of claim 19, wherein the self-propelled power relay device is a robotic device configured to perform the activity, and wherein the deploying of the self-propelled power relay device to the configurable, predetermined location is further based on the determining that the self-propelled power relay device is not currently required to perform the activity within the area.

* * * * *